Oct. 4, 1966  J. W. CASPERS  3,277,468
RADAR RANDOM PERMUTATION SCAN METHOD
Filed Feb. 18, 1963  2 Sheets-Sheet 1
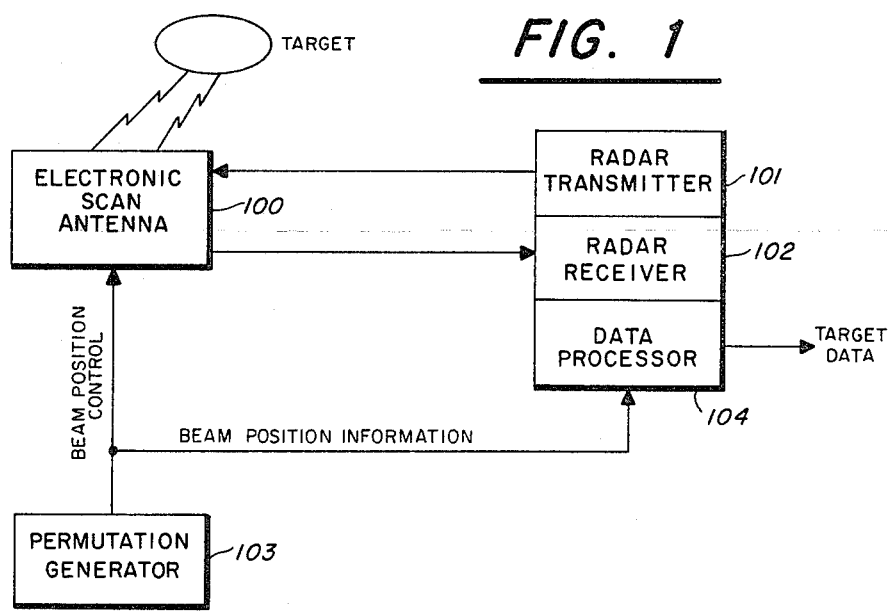
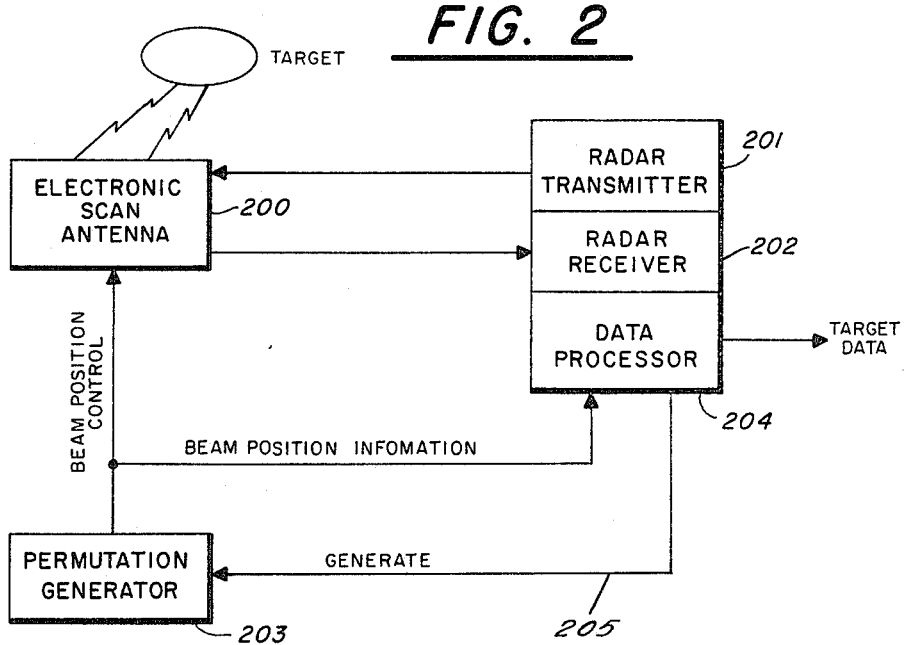
INVENTOR.
JAMES W. CASPERS
BY
*ATTORNEYS*

Oct. 4, 1966        J. W. CASPERS        3,277,468

RADAR RANDOM PERMUTATION SCAN METHOD

Filed Feb. 18, 1963        2 Sheets-Sheet 2

INVENTOR.
JAMES W. CASPERS

BY

ATTORNEYS 3,277,468
RADAR RANDOM PERMUTATION SCAN METHOD
James W. Caspers, San Diego, Calif., assignor to the United States of America as represented by the Secretary of the Navy
Filed Feb. 18, 1963, Ser. No. 259,795
3 Claims. (Cl. 343—7.4)

The invention described herein may be manufactured and used by or for the Government of the United States of America for governmental purposes without the payment of any royalties thereon or therefor.

The present invention relates to a method and system for controlling the scan of a radar antenna and more particularly to a system and method for randomly permutating radar scan.

In a target detection system false target tracks may be generated at azimuth directions different from that of a planned attack and thus draw attention away from attacking missiles and planes. One method of generating false target tracks consists of transmitting signals back to the detection radar timed such that these signals are packed up on the back lobe or side lobes of the radar systems.

In order to generate these false targets or spoof the radar system, the spoofer must know the necessary time relations of the radar antenna. Thus, the spoofer must know that the antenna rotates in a certain fashion and this fashion must be non-random, i.e., must have a particular program. One example of this would be a programmed rotation of the radar antenna or a particular step scan sequence.

Prior art methods of accomplishing the elimination of false radar tracks employed an omni-directional antenna and a cancellation or blanking scheme. Such a method removes signals received by back lobes or side lobes of the scanning antenna. Such a system is illustrated in Patent No. 2,825,900 to F. R. Collbohm. More sophisticated methods would employ antennas matched to the scanning antenna with the main lobe deleted. The omni-directional antenna introduces severe losses in radar sensitivity while the second introduces difficult if not impossible antenna design problems but still at the expense of reduced radar sensitivity.

An object of the present invention is to provide a method and system for combating the generation of false target tracks in a detection system.

Another object of the present invention is to provide a method and system for permitting the antenna scan in an irregular way.

A further object of the present invention is to provide a method and system for randomly permuting the antenna scan in a radar detection system.

An additional object of the present invention is to provide a method and system for combating the generation of false target tracks by permuting the antenna scan in a random way such that time relations are unknown to the generator of the false target tracks.

An additional object of the present invention is to provide a method and system for randomly permuting the antenna scan wherein the scan is in discrete steps.

A further object of the present invention is to provide a method and system for combating the generation of false target tracks in a radar detection system by permuting the antenna scan in a random stepped manner and controlling the amount of time the antenna scan is at any one step through the use of received radar information.

Various other objects and advantages will appear from the following description of several embodiments of the invention, and the novel features will be particularly pointed out hereinafter in connection with the appended claims.

These and other objects, advantages, features, and uses will become more apparent from the following description taken in conjunction with the accompanying drawings wherein:

FIG. 1 is a block diagram of one embodiment of the present invention employing fixed sampling;

FIG. 2 is a block diagram of another embodiment of the present invention employing sequential detection;

Figure 3:
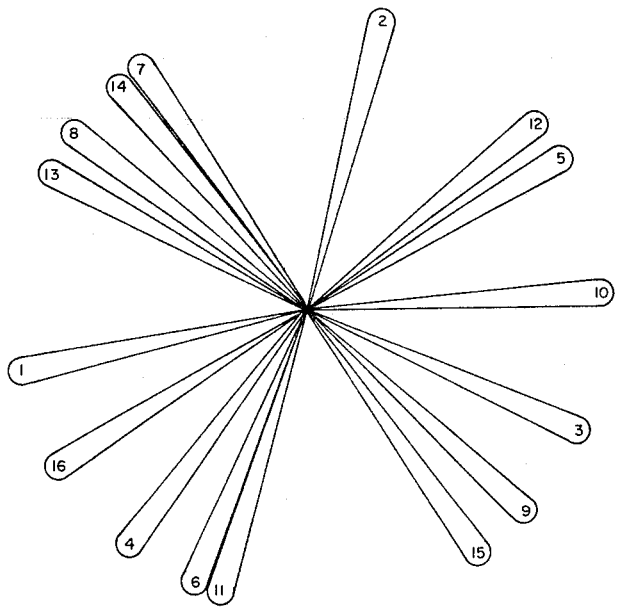
FIG. 3 is a showing of a typical first 16 of 90 beam positions.

In FIG. 1, there is shown an electronic scan antenna 100 the details of which are not shown in that they form no part of the present invention. However, it is to be understood that electronic scan antennas are old and well known at this time. In such an antenna the physical portion of the antenna is not moved but rather the elements of the antenna are scanned electronically and beam shaping takes place as determined by the electronic circuitry contained therein.

A conventional radar transmitter 101 of the pulse type is connected to the electronic scan 100 and transmits pulses of energy into a given medium. Also connected to the electronic scan antenna is a radar receiver 102 which receives reflected energy from the given medium and which is conventional.

A permutation generator 103 is provided which forms the subject matter of co-pending application Serial No. 256,174, filed February 4, 1963, entitled Random Permutation Generator, now Patent No. 3,171,082. This permutation generator might also be a punched tape or computer or any other means for generating random pulses. The output of the permutation generator 103 is connected to the beam positioning control, not shown, within the electronic scan antenna 100. The same output is also coupled to a data processor 104 so that the position control information may be correlated and utilized in the data processor.

In the operation of this embodiment the electronic scan antenna 100 radiates and receives electromagnetic energy to and from targets in a given medium. The scan is conducted in such a manner that the scan is stepped in azimuth sequentially. However, the scan while being sequential is not programmed sequentially, i.e., the permutation generator output determines the beam position at any one time. The output of the permutation generator is purposely chosen as being completely random in nature. However, the randomness is random only to the extent that no two positions are duplicated nor is any position skipped before a new sequence begins, i.e., if the beam has 90 positions, all 90 of the positions are used before any one beam position is repeated. However, the positions are not necessarily from 1–90 in order nor are any two sequences encompassing the ninety beam positions the same.

The transmission of the energy from the radar transmitter 101 is conventional as is the reception of the energy at radar receiver 102. In the data processor 104 the beam position information is correlated against the received information from the radar receiver 102 and the correct target track determined. Through the use of such a method and a system the spoofer or false target track generator is not able to time the signals back to the radar antenna in a manner that the signals are picked up on the back lobes or side lobes of the radar system.

In the embodiment of FIG. 2, a conventional electronic scan antenna 200 is provided which transmits and receives electromagnetic energy from and into a given medium. A conventional radar transmitter 201 is coupled to the electronic scan antenna for generating high energy pulses of electromagnetic energy. A radar receiver 202 which is conventional is also coupled to the electronic scan antenna for receiving electromagnetic energy reflected from targets in the medium.

Again, a random permutation generator 203 is provided which may be the same as that of the embodiment of FIG. 1. One output from the permutation generator corresponding to a beam position control signal is coupled to the electronic scan antenna and the same output is coupled to a data processing equipment 204. In this instance, the data processing equipment would correspond to that set forth in co-pending application, Serial No. 58,855, filed September 27, 1960, entitled Sequential Signal Detector, now Patent No. 3,145,379; or co-pending application, Serial No. 144,518, filed October 11, 1961, entitled Binomial Sequential Detector, now Patent No. 3,171,119; or co-pending application, Serial No. 144,519, filed October 11, 1961, entitled Modification and Connection of Sequential Detectors in Banks for Parallel Operation, now Patent No. 3,153,231. The data processing system corresponding to 204 might also be such as that set forth in co-pending application, Serial No. 137,944, filed September 8, 1961, entitled Track Before Detect Radar System.

An output is taken from the data processor on output line 205 and coupled to the permutation generator which output is used to control the output from the permutation generator.

In this instance the electronic scan indicator is caused to step scan in a completely random fashion as was the embodiment of FIG. 1. If there are 90 beam positions the 90 beam positions would be covered in a random fashion before a new sequence is initiated. However, in this instance, the amount of time at each step of the scan of the antenna is determined by the data processing equipment 204. Thus, the data processing equipment would have to make a decision of target or no target or some other predetermined decision before the antenna would scan to a new position.

FIG. 3 illustrates a typical first sixteen of the 90 beam positions possible utilizing the embodiment of the present invention. As can be seen from FIG. 3 the pattern is completely random.

Figure 4:
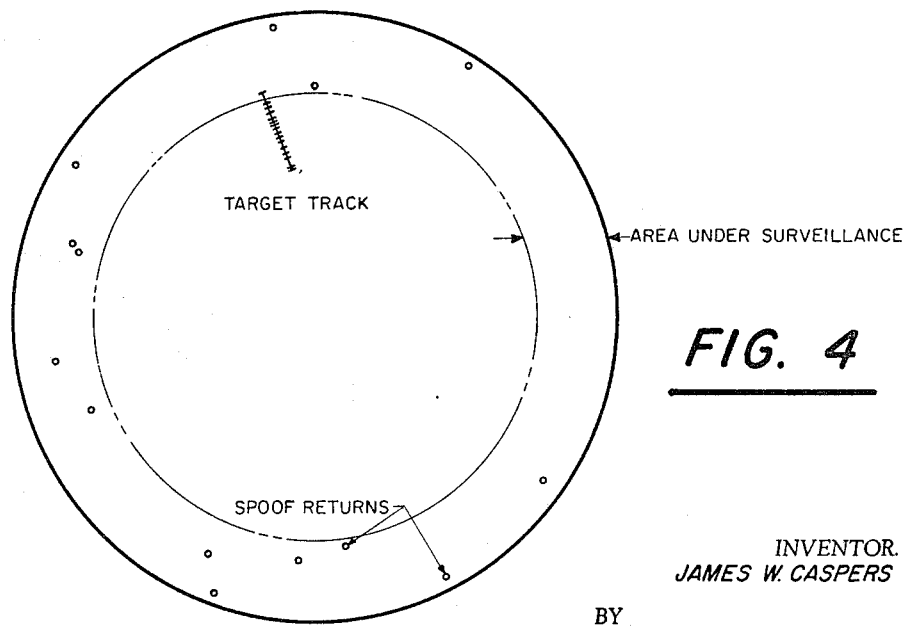
FIG. 4 is a showing of the random permutations scan as applied to a target track and spoof returns in a detection zone.

FIG. 4 illustrates random permutation scan utilizing the embodiment of FIG. 2 wherein a track before detect radar or one of the sequential radar systems is used. As can be seen the track shows up in an ordered fashion while the spoof returns are completely random and disoriented and would be apparent to the operator of the system to be false target tracks.

FIG. 4 illustrates the situation where a true target track exists and a spoofer generates a regular sequence to indicate a false track at an azimuth different from the true track corresponding to the spoofer's position. Due to the completely random scan of the present system, however, the spoofer's returns show up in a completely random fashion rather than having any order.

Random Permutation Scan is applicable to conical, or other pattern scans, used in fire control or guidance. An effective countermeasure to these periodic scans is the use of a repeater or a spinning reflector. This introduces a periodic modulation of the reflections seen by the radar. If this modulation has the same frequency as the scanning antenna a serious angular bias error is introduced into the fire control or guidance system. The scanning frequency is available to the enemy and even if the scanning frequency were not available, a variation in the countermeasure modulation frequency could, by sweeping through the scan frequency introduce the desired effect. If the conical, or other pattern scan, is randomly permuted periodic modulation introduces no bias error into the fire control or guidance system. A random error will be seen, however, this can be averaged out and greatly reduce the effectiveness of modulation schemes for angle reception.

Considerations similar to the above apply in the search radar when beam splitting (either operator or automatic) is used to enhance angular information. A small angular error at long ranges has undesired effects on intercept or the computation of missile trajectory.

The present invention illustrates a system and method for combatting the generation of false target returns which does not degrade signal detectability and is relatively impervious to the combination of jamming and spoofing. In addition the system effectively combats angular deception without reducing radar sensitivity. Another advantage of the present system is that scan modulation cannot be simulated.

Random permutation scan also eliminates unintentional angular bias caused by propeller modulation, or any other periodic modulation, in guidance systems for aircraft landing on ships or land.

Further, by using random scan a tracking beam might be introduced in such a manner that the enemy would not recognize the fact that he has been detected once detection has been accomplished.

Obviously many modifications and variations of the present invention are possible in the light of the above teachings. It is therefore to be understood that within the scope of the appended claims the invention may be practiced otherwise than as specifically described.

What is claimed is:

1. A method of random scanning comprising the steps of:
   radiating and receiving electromagnetic energy in a given medium;
   rotating the radiator of the electromagnetic energy during radiation and reception;
   controlling the rotation of the radiator during reception and radiation of electromagnetic energy such that the rotation of the radiator is completely random in nature.

2. The method of random scanning comprising:
   radiating and receiving electromagnetic energy from a radiator;
   stepping the radiator in a rotative manner during radiation and reception of electromagnetic energy in such a fashion that the manner of stepping is completely random in nature;
   and controlling the time interval during which the radiator is held at any one step of the rotative pattern through the use of received electromagnetic energy;

3. The method of random scanning in a target detection system comprising:
   radiating and receiving electromagnetic energy from a radiator into a given medium;
   rotatively stepping the radiator in a completely random fashion;
   and controlling the time at which the radiator is held at any one step in a completely random pattern through the use of received electromagnetic energy.

References Cited by the Examiner
UNITED STATES PATENTS

| | | | |
|---|---|---|---|
| 2,842,764 | 7/1958 | Harvey | 343—14 |
| 2,958,862 | 11/1960 | Rey | 343—14 |
| 3,042,917 | 7/1962 | Elhoff | 343—117 |
| 3,056,961 | 10/1962 | Mitchell | 343—100.6 |
| 3,083,360 | 3/1963 | Welty et al. | 343—100.6 |

CHESTER L. JUSTUS, *Primary Examiner.*

R. M. SKOLNIK, P. M. HINDERSTEIN,
*Assistant Examiners.*